March 28, 1961 I. FOX ET AL 2,977,231
PACKAGING AND DISPENSING BEVERAGE CONCENTRATES
Filed Feb. 19, 1960

INVENTORS
IRVING FOX
SIDNEY PALLEY
BY
ATTORNEYS

United States Patent Office 2,977,231
Patented Mar. 28, 1961

2,977,231

PACKAGING AND DISPENSING BEVERAGE CONCENTRATES

Irving Fox, Jamaica, and Sidney Palley, Brooklyn, N.Y., assignors of one-half to Cecil Wolfson, Jacksonville, Fla., and one-half to Fox-Wiprite Corp., Brooklyn, N.Y., a corporation of New York Filed Feb. 19, 1960, Ser. No. 9,839

22 Claims. (Cl. 99—79)

This invention relates to improvements in the packaging and dispensing of beverage concentrates, and includes improvements in beverage concentrates in pressurized packages containing such concentrates, and in methods of dispensing such concentrates to form self-agitated beverages therefrom.

The invention includes an improved pressurized package comprising a pressure-tight container with beverage concentrate of regulated viscosity in it and having a discharge valve with a regulated small discharge orifice of a size that will give a small high velocity jet of the concentrate which will effect self-agitation of the aqueous liquid, such as milk and water, into which the jet is discharged to form the beverage without the necessity of stirring or agitating.

We have found that when beverage concentrates of regulated viscosity are packaged in pressurized containers with discharge valves having a small discharge orifice of regulated size, the beverage concentrate can be discharged downwardly into a glass of aqueous liquid, such as water or milk, in the form of a small jet of high velocity which will effect thorough instantaneous self-agitation of the liquid into which it is discharged, without the necessity of stirring or mechanical agitation.

The invention, in its broader aspects, includes a number of different inventions or improvements, including improved beverage concentrates, and improved pressurized packages containing different beverage concentrates.

It has been proposed to package food products in pressurized containers which will dispense the food product as a foam or spray or as a solid stream. For spray dispensing, the liquid is of such a nature and discharge valves are so constructed as to break up the discharged liquid stream into an acceptable spray. For the production of foams, such as whipped cream, valves with relatively large orifices are used. For the production of solid streams, valves with relatively large orifices are also used. When such large streams are discharged into water or milk to form a beverage, mechanical agitation, such as stirring with a spoon, is required for mixing the concentrates to form the beverage.

In contrast with such methods of dispensing food products, the present invention provides a pressurized container with a valve having a regulated small discharge orifice which will discharge the beverage concentrate in the form of a small, high velocity jet stream into the water or milk with effective self-agitation to produce the beverage, without stirring with a spoon or mechanical agitation.

The invention includes a new method, and a number of specifically different methods with different beverage concentrates, whereby a self-mixed beverage is directly produced by the discharge of a small, high velocity jet stream of the beverage concentrate downwardly into a glass of aqueous liquid, such as water or milk, with effective self-agitation to produce the beverage without the need of stirring or mechanical agitation.

We have developed an improved chocolate syrup of regulated viscosity and of a much higher content of cocoa and sugar than contained in ordinary soda fountain chocolate syrups such that as little as half an ounce or so of the improved syrup, when discharged into a glass of milk, will give instantly an improved chocolate milk drink. With ordinary soda fountain chocolate syrups, an ounce or so of the chocolate syrup is required for a glass of chocolate milk, and agitation with a spoon or other agitation is required to make the beverage. With the improved concentrated chocolate syrup in a pressurized container having the improved high velocity jet discharge valve, a container with 10 ounces or 12 ounces of the improved syrup will produce approximately 20 glasses or 24 glasses of chocolate milk.

We have also found that fruit syrups and other flavored syrups such as are commonly used at soda fountains and added to milk or water to form beverages can be made in an improved form with much higher concentration of sugar and flavoring ingredients than soda fountain syrups such that as little as half an ounce or so of the syrup can be used in the improved dispensing container with its regulated discharge valve to produce a high velocity jet and a satisfactory glass of beverage comparable to that produced with an ounce or so of ordinary soda fountain syrups. As a result, a pressurized container with 10 or 12 ounces of the improved syrup can be used to produce about 20 or 24 glasses of beverage.

We have also found that fruit juice concentrates, of regulated viscosity, can be advantageously dispensed in the improved pressure packages with the improved high velocity jet discharge valves to produce improved fruit beverages when these concentrates are discharged into a glass of water with self-agitation to produce the fruit juice without the need of stirring or mechanical agitation.

We have also found that milk concentrates, and milk concentrates admixed with chocolate syrup, can advantageously be dispensed in the improved pressurized containers, with their valves for discharging a high velocity jet of the concentrate, to make a milk or chocolate milk beverage.

We have also found that coffee and tea concentrates, of proper viscosity, can advantageously be packaged in the improved pressurized container and dispensed therefrom through the improved high velocity jet discharge valves to produce coffee or tea beverages without the need for stirring or mechanical agitation.

Where the beverage concentrate requires sterilizing, it is subjected to a sterilizing treatment prior to introduction to a sterile container and the packaging operation is carried out under sterile conditions, or the finished package is subjected to a sterilizing treatment.

One or more vitamins can be incorporated in the food concentrate to give a vitamin-enriched concentrate, for making a self-agitated beverage.

The gas or propellant which is used in the pressurized container, with the beverage concentrate, should be harmless to the packager as well as to the consumer and should present no unusual hazards during packaging, storage and use. It should be substantially inert chemically, particularly during the life of the pressurized package. Naturally it should have no adverse effect to any appreciable degree on the odor, flavor, appearance or texture of the discharged beverage concentrate. It should also be non-corrosive, especially with respect to the container. Thus the selected propellant or combination of propellants should be non-corrosive, chemically inert, non-toxic and free from adverse effects on the contained concentrate and the dispensed product. Pressures above 50 pounds, and advantageously pressures of above 75 pounds, and up to around 100 pounds are used.

With certain of the beverage concentrates a soluble gas such as nitrous oxide or carbon dioxide, or mixtures of them, is advantageously used. The use of such gases with certain beverage concentrates, such as chocolate syrup or flavored syrups, has the advantage that the high velocity jet discharge from the pressurized container into a glass of water or milk expands appreciably when discharged through the small orifice and forms a high velocity jet which is of lower specific gravity than the water or milk into which it is discharged for effecting self-agitation. Such expansion of the gas or foaming as takes place does not interfere with the effective high velocity agitating action of the jet, when discharged into a glass of water or milk, but instead promotes the agitation and the formation of a uniformly self-agitated product.

Suitable liquid propellants can also be used, such as 5% to 10%, more or less, of Freon C 318 (octafluorocyclobutane); or mixtures of nitrous oxide and such a liquid propellant, e.g. 85% nitrous oxide admixed with 15% of such liquid propellant.

Nitrogen gas is relatively insoluble in the beverage concentrates, with the result that the discharged high velocity jet stream may have little, if any, gas discharged with it. But effective high velocity self-agitating jets can nonetheless be produced with the use of nitrogen as a propellent gas with certain of the food concentrates. When, however, the beverage concentrate in the pressurized container is thoroughly agitated before it is dispensed, some of the nitrogen gas will be intimately distributed throughout the concentrate and will be discharged therefrom in the jet stream which expands somewhat as it is discharged through the high velocity orifice, with resulting improvement in the self-agitating effect of the resulting high velocity stream or jet.

The valves used in the improved packages are specially designed to provide a small discharge orifice for the beverage concentrate.

The usual dip valves which have tubes extending to the bottom of the container, and the tilting or "nozzle down" types of valves, used for dispensing whipped cream or other food products in the form of a foam or solid stream, have relatively large discharge passages and dispense relatively large streams which require stirring or mechanical agitation for mixing the product with water or milk.

In contrast with such valves, the improved valves used in the packages and process of the present invention have a restricted discharge orifice, and the food concentrate has a regulated viscosity, such that the propellent gas will discharge the concentrate downwardly in a high velocity jet stream which will cause self-agitation of the water or milk into which it is discharged.

We have found that the size of the discharge orifice should be carefully regulated and controlled, and that the viscosity of the food concentrate should also be controlled, so that the pressurized gas will effect the desired high velocity jet discharge of the food concentrate. The size of the orifice can be somewhat varied with different viscosities of the food concentrate, but in general, we have found that discharge orifices of the order of from about 0.05 to about 0.09 inch in diameter are advantageously used. A discharge orifice of somewhat increased or decreased size can be used with certain beverage concentrates dependent on the viscosity of the concentrate. But the size of the discharge orifice should be correlated with the viscosity of the food concentrate and with the pressure of the propellent gas to insure that the beverage concentrate is discharged in the form of a high velocity jet which will have a self-agitating action on the glass of milk or water in which it is discharged.

The use of a container with a valve having such a regulated small discharge orifice has the advantage that even small amounts of beverage concentrate, such as half an ounce, and requiring only a few seconds to dispense this amount, can be regulated with sufficient approximation to dispense even such small amounts of concentrate. An estimation of the velocity of the discharge jet indicates that it is of the order of magnitude of several inches per second, e.g. the order of 10 to 15 inches per second, although the particular velocity may vary somewhat depending upon the exact size of the discharge orifice, the viscosity of the food concentrate and the pressure of the propellent gas. In any event, a small jet of fluid concentrate is discharged with a sufficient velocity so that it will effect thorough self-agitation of the glass of water or milk into which it is discharged, and will do this almost instantly and within a matter of a very few seconds.

The accompanying drawings illustrate one form of pressurized package and valve, and the invention will be further described and illustrated in connection therewith.

Figure 1:
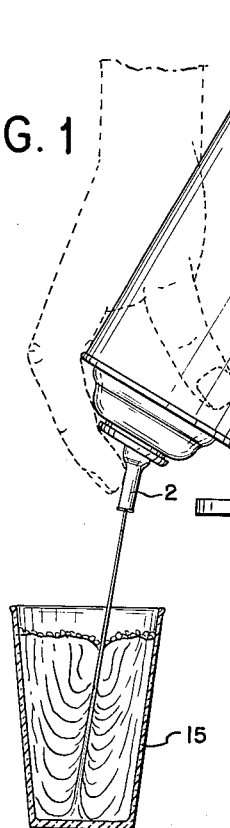
Fig. 1 illustrates, somewhat conventionally and diagrammatically, the use of the pressurized container and the discharge of a small high velocity stream therefrom into a glass of milk or water to effect self-agitation thereof.
Figure 2:
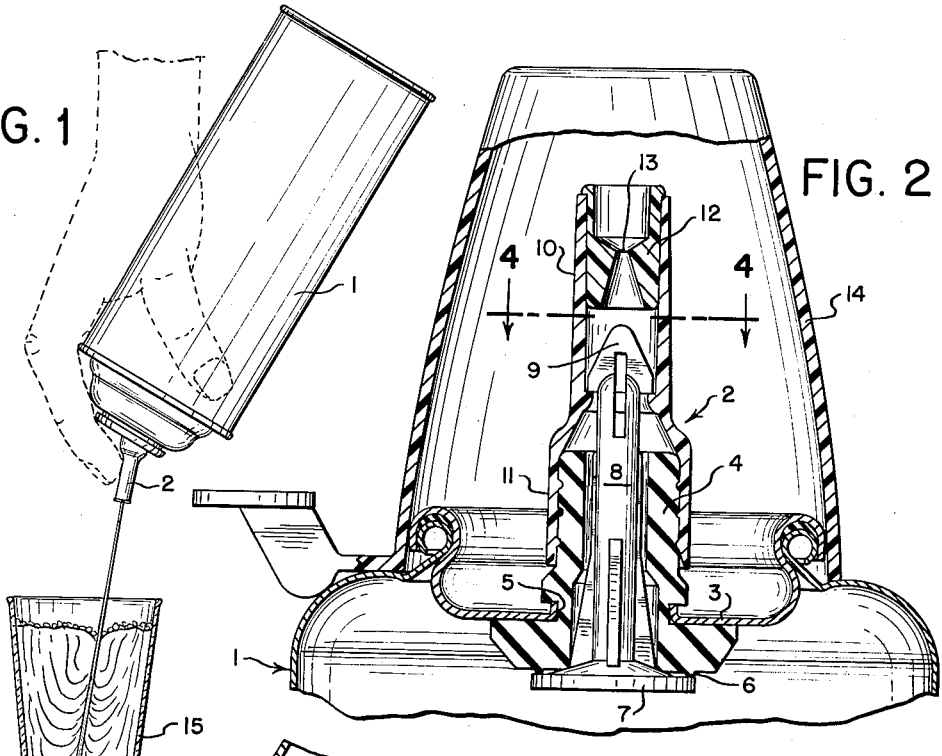
Fig. 2 shows in section the upper end of the container and one form of valve construction.

In the drawing a pressure-tight container 1, such as a standard 16-ounce container, has a tilting discharge valve, the outer portion of which is indicated at 2, this valve being mounted in the closure 3 at the top of the container. A flexible rubber member 4 is mounted in an opening 5 in this closure and has a valve seat 6 against which the valve member 7 is normally held by the pressure in the container. This valve has a valve stem 8 extending up through the member 4 and terminating in a portion 9 located in the upper portion 10 of the tubular member 2, the lower portion of which 11 surrounds the rubber member 4.

The upper portion of the tubular member 10 has an insert 12 therein with a restricted discharge opening 13. The passageway from the valve 7, extending between the stem 8 and the surrounding members, is sufficiently larger than the size of the orifice 13 so that, when the valve is tilted as illustrated in Fig. 3, the beverage concentrate will flow freely under pressure to the discharge orifice.

Figure 3:
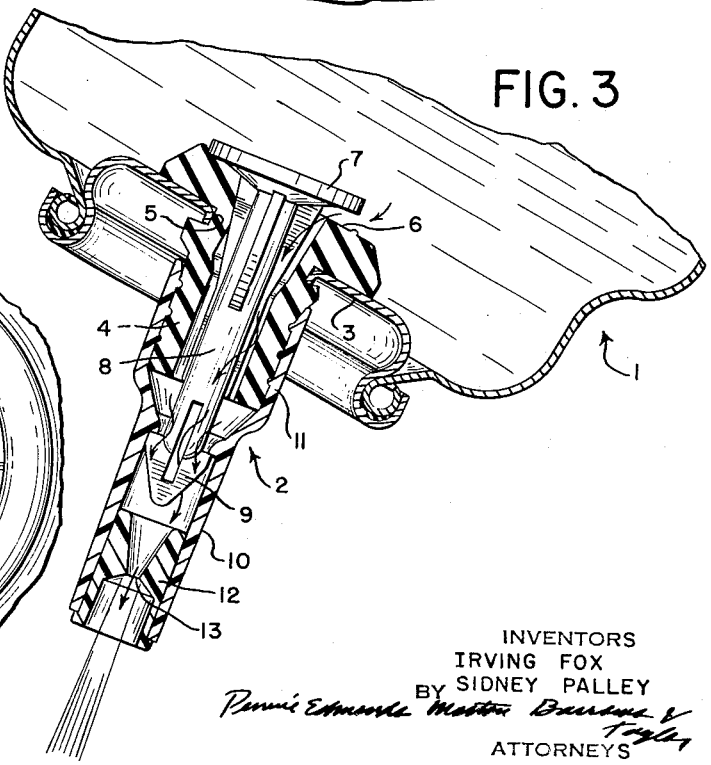
Fig. 3 shows a similar portion of the container and valve in operating position.
Figure 4:
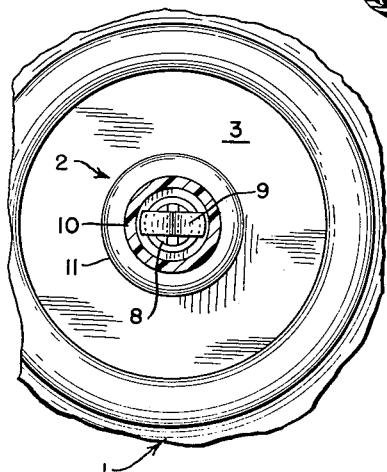
Fig. 4 is a sectional view of the line 4—4 of Fig. 2.

The valve shown is of the tilting valve type and is operated by tilting the valve stem as illustrated in Figs. 1 and 3. As the valve is tilted and opened the pressurized concentrate is forced through the passages leading to the orifice 13, and through the orifice in the form of a small stream at high velocity.

The operation of the pressurized container is illustrated conventionally in Fig. 1. As a result of the tilting of the valve stem by the finger when the container is inverted there is a downward discharge of a small, high velocity jet of the concentrate which will effect self-agitation of a glass of milk or water into which it is discharged, as illustrated somewhat conventionally in Fig. 1.

Valves which do not contain a restricted orifice, such as 13, but which have the upper portion of the valve, such as the tubular member 10, free from obstruction, will discharge a relatively large stream of concentrate to form, e.g., a foam such as whipped cream, or a large stream of concentrate, which require stirring or agitation to mix them with the liquid into which they are discharged.

But by providing a restricted orifice, through which the concentrate is discharged as a high velocity small stream, it is possible to effect self-agitation of the liquid into which this stream is discharged, so the stirring with a spoon or mechanical agitation is unnecessary.

The size of the restricted opening in the discharge valve can be somewhat varied, with variations in the viscosity of the concentrate, but in general we have found that valves with restricted openings of the order of 0.05 to 0.09 inch in diameter can be used. With concentrates of somewhat lower viscosity a somewhat larger discharge orifice can be used, e.g. up to around 0.11 inch in diameter. The size of the discharge orifice should be so regulated, with reference to the viscosity of the concentrate and the pressure of the pressurizing gas, so that the concentrate will be discharged as a high velocity self-agitating jet.

With valves such as that illustrated in the drawings, the size of the valve opening, when the valve is opened, and the size of the passages leading to the restricted discharge orifice, will be larger than the discharge orifice. In some cases the bore of the discharge orifice is advantageously around 0.08 inch in diameter or between about 0.070 and 0.08 inch. In other cases a somewhat wider range can be used, e.g., an orifice having a bore of about 0.050 to about 0.090 inch in diameter or somewhat more, depending upon the viscosity of the concentrate with which it is used.

The different concentrates vary in their viscosities. With the improved chocolate syrup, viscosities within the range of about 150 or somewhat less centipoises to about 700 centipoises have been found satisfactory. With fruit and other flavored syrups, the range of viscosity can be e.g. around 225 centipoises or somewhat less to around 750 centipoises. With concentrated fruit juices, most of which fall within the class known as "non-Newtonian liquids," it is difficult to obtain a true viscosity value.

In preparing the pressurized beverage concentrate there is first filled into the container, e.g., a 16-ounce open type conventional can, around 9 or 12 ounces more or less, of the beverage concentrate and a valve such as that illustrated in the drawings is applied by crimping the cover member 3 over the top of the can thereby hermetically sealing the can interior to produce a pressure-tight container.

The can is then pressurized by the introduction of the pressurizing gas through the valve. When a soluble gas, such as nitrous oxide or carbon dioxide, is used as the pressurizing gas, the can is constantly agitated to assist in saturating the concentrate with dissolved gas and to give a final pressure in the can of e.g. around 75 to 100 pounds per square inch more or less. The upper limit of gas to be used in such a container is controlled by government regulations and is of the order of about 100 pounds per square inch.

When nitrogen gas is used as the pressurizing gas it is relatively insoluble in the concentrate and agitation during pressurizing is not required.

When the cans have been filled and pressurized they should be tested for leaks and defects.

A removable cover 14 is shown for covering and protecting the discharge valve during shipping and storage, and between period of use. This cap is readily removable to prevent use of the container and can be readily replaced after use.

Certain beverage concentrates require sterilizing to protect them from deterioration. This sterilizing can advantageously be effected before the cans are filled with the concentrate, and the filling and pressurizing carried out under sterile conditions to insure the sterility of the concentrate in the container.

Sterilization can also be carried out in some cases after the container is filled or even in the pressurized container. In certain concentrates such as chocolate and flavored syrups, sterilization may not be required.

In the use of the pressurized containers it is advantageous to shake the container before the concentrate is discharged therefrom. This has the advantage of overcoming any lack of uniformity in the concentrate and, when nitrogen is used as a propellant, the agitation distributes some of the nitrogen through the concentrate and may result in the discharge of an expanded stream of liquid due to the nitrogen so distributed.

When the container is to be used for the dispensing of the concentrate into a glass of an aqueous liquid such as water or milk, the protective cap is removed, the container is shaken and then inverted and the tilting valve moved as illustrated in Fig. 1 to discharge a small high velocity stream of the concentrate as a self-agitating stream downwardly into the liquid to be admixed with the concentrate to form a beverage.

One of the surprising results obtained by the use of the present method and dispensing container with its self-agitating jet of concentrate discharged into the aqueous liquid, is that an improved flavor has been repeatedly obtained as compared with a beverage made from the same concentrate when it is first discharged into a glass, and water or milk then added, and the mixture stirred to form the final beverage. Repeated comparative taste tests between beverages produced, on the one hand, by adding a beverage concentrate to a glass and then adding water or milk and then stirring vigorously, and, on the other hand by self-agitation by discharging the high velocity jet of concentrate into the liquid, have shown that a more flavorful beverage is obtained in the latter case from the same amount of concentrate. This improvement has the further advantage of enabling somewhat less of the concentrate to be used to obtain a beverage of comparable flavor.

While this advantage with the beverage has been repeatedly observed, we do not desire to limit ourselves by any theoretical explanation of the reason for it. But apparently the self-agitation, particularly of the concentrate containing dissolved gas therein, seems to effect particularly effective distribution of the concentrate, and admixture with the milk or water in a particularly advantageous manner.

*Chocolate syrup packages*

It has been proposed to package certain chocolate syrups in pressurized containers using nitrogen gas as the propellant and with conventional valves which discharge a relatively large stream of the syrup into the liquid which is to receive the syrup. With syrups of relatively high consistency and viscosity the propellent gas functions as a piston upon the upper face of the syrup so the syrup can be forced up through a dip tube and out through a relatively large valve controlled orifice, or through a downwardly discharging tilting valve with a relatively large orifice. When the appropriate amount of syrup is so dispersed into the selected liquid it is necessary to stir or agitate the liquid to disperse the syrup throughout the liquid in order to obtain the desired chocolate drink.

Ordinary soda fountain chocolate syrups are usually of relatively high viscosity and require about an ounce of the chocolate syrup to make a chocolate drink; and stirring or mechanical agitation is required to disperse the syrup to make the drink.

We have developed an improved chocolate syrup, of high concentration and regulated low viscosity, such that only about half an ounce of the syrup is required to make a chocolate drink when the syrup is dispersed as a high velocity jet stream through a restricted orifice into a glass of milk to make a chocolate drink. Effective agitation and dispersion are effected by such self-agitating jet, so that mechanical agitation is unnecessary, and so that a chocolate drink of improved taste can be obtained.

In producing the improved concentrated chocolate syrup, of which only about half as much is required as of ordinary soda fountain chocolate syrup, we have found that it is not necessary to double the amount of cocoa and of sugar, as compared with soda fountain syrups, but that amounts of sugar and cocoa somewhat less than twice the amount required for soda fountain syrups are sufficient to give an improved chocolate milk drink.

We have also found it important to regulate the viscosity of the improved chocolate syrup and keep it within approximate limits, with reference to the restricted opening in the discharge valve, to obtain an effective self-agitating high velocity jet of syrup.

We have found that soluble gases, particularly nitrous oxide, and mixtures of nitrous oxide and carbon dioxide, are particularly advantageous in the pressurized containers with such chocolate syrup and with a discharge valve having a regulated small orifice to produce a self-agitating jet. Such gases are soluble in chocolate syrup to a certain extent and the high velocity jet of chocolate syrup expands on discharge from the orifice and is in the form of a somewhat foamy high velocity jet which is particularly effective in bringing about thorough agitation and distribution of the chocolate syrup in the beverage and in giving the beverage an improved flavor.

While soluble gases such as nitrous oxide are advantageously used, it is possible, although less advantageous, to use nitrogen gas as the propellant provided the container is thoroughly shaken before use, since this brings about a sufficient distribution of the nitrogen gas throughout the syrup to give a somewhat expanded jet as the self-agitating jet.

With the improved chocolate syrup, we have found that the viscosity is advantageously within the range of about 150 centipoises to about 700 centipoises, and that the size of the restricted openings in the discharge valve are advantageously within the range of about 0.06 to about 0.09 inch in diameter and more advantageously within the range of about 0.07 to 0.08 inch in diameter.

The fact that the self-agitating stream is a small stream makes it possible to regulate the discharge of the chocolate syrup so as to readily approximate the proper amount required for a chocolate drink even though this small amount is only about ½ ounce. A short period of time of the order of around 3 seconds, more or less, is sufficient to discharge this amount of syrup and the almost instantaneous self-agitating action enables effective mixing of the syrup and milk during even this short period of time. An estimated velocity of discharge of the high velocity jet is around 10–15 inches a second, more or less. The velocity should be sufficient to effect self-agitation of the liquid, but should not be so high as to give objectionable violent agitation.

Utilization of dissolved gases, such as nitrous oxide, with the improved chocolate syrup not only give a self-agitating stream for producing a finished chocolate drink without further mixing or stirring, but give an improved chocolate drink. The dissolved gas, or gas trapped within the product when discharged, appears to have a dispersive or disintegrating action on the syrup and to facilitate uniform distribution of the syrup in the beverage.

Comparative taste tests were made between two different chocolate drinks. In one case we took ½ ounce of the chocolate syrup and placed it in the bottom of a container and then added 5½ ounces of milk and stirred vigorously and then poured portions of this drink into different glasses for people to taste. In another case the same amount of 5½ ounces of milk was used and the same amount of syrup, ½ ounce, was added as a self-agitating stream to create self-agitation and to produce a chocolate milk without further agitation. Portions of this drink were also placed in different glasses for people to taste. All of those who made comparative taste tests on the two chocolate milks chose the product produced by the self-agitation of the beverage as being more flavorful than the one produced by stirring the chocolate syrup and milk in the conventional manner.

The improved mixing of the self-agitating stream makes it possible to reduce somewhat the amount of syrup required to produce a comparable taste to that of chocolate drinks made by stirring the chocolate syrup and milk with a spoon in the ordinary way.

The following examples will illustrate the improved chocolate syrups and their use in the pressurized chocolate syrup packages. In the formulas of the following examples the stabilizer, referred to as H. F. Stabilizer, is an extract of Irish moss purified and standardized into a free-flowing, flaky, and powder-like material completely soluble in hot water. It hydrates easily to form viscous solutions and gels. It will absorb approximately 30 times its weight of water. The propellent gas was nitrous oxide and the pressure in the package about 100 pounds per square inch.

EXAMPLE 1

A chocolate syrup was made containing the following ingredients in the following proportions per gallon of syrup:

| | Ozs. |
|---|---|
| Liquid invert syrup (41° Bé.) | 90 |
| Water | 34 |
| Malt | 2 |
| Cocoa (Dutch Process, 18–20% fat) | 10 |
| Milk powder | 2 |
| H. F. Stabilizer | .002 |
| Salt | .031 |
| Disodium phosphate | .031 |
| Vanillin (powder) | .031 |

This syrup showed a specific gravity of 1.306, a Baumé gravity of 33.0, a Brix of 63.25, and a viscosity of 173 centipoises.

This chocolate syrup was packaged in a pressurized container such as above-described using nitrous oxide at 100 pounds per square inch pressure. Valves having valve orifices restricted to about 0.07 to about 0.085 inch in diameter were found advantageous for use with this syrup.

This syrup worked well at room temperature, but when placed in a refrigerator and cooled to around 45° F. tended to increase in viscosity with resulting undesirable reduction in the rapidity of its discharge from the container.

EXAMPLE 2

The chocolate syrup of this example could be stored in the refrigerator at temperatures of around 45° F. and used to produce a satisfactory self-agitating stream or jet, using nitrous oxide as the pressurizing gas at 100 pounds pressure.

This chocolate syrup contained the following ingredients in the following proportions per gallon of syrup:

| | Ozs. |
|---|---|
| Liquid invert syrup (41 Bé.) | 90 |
| Water | 34 |
| Cocoa (14 to 16% fat) | 11 |
| Milk powder | 2 |
| H. F. Stabilizer | .002 |
| Salt | .031 |
| Disodium phosphate | .031 |
| Vanillin | .031 |

This syrup at 72° F. showed a specific gravity of 1.310, 34.0 Baumé, 63.5 Brix and a viscosity of 169 centipoises. After refrigeration at 48° F. the product showed a specific gravity of 1.320, 34.0 Baumé, 64.0 Brix, and a viscosity of 500 centipoises.

EXAMPLE 3

A chocolate syrup was made containing the following ingredients in the following proportions per gallon of syrup:

| | Ozs. |
|---|---|
| Liquid invert syrup (41° Bé.) | 90 |
| Water | 34 |
| Cocoa | 11 |
| H. F. Stabilizer | .002 |
| Salt | .031 |
| Disodium phosphate | .031 |
| Vanillin | .031 |

This syrup showed a specific gravity of 1.310, 33.5 Baumé, 64.0 Brix and a viscosity of 200 centipoises at 72° F. After refrigeration at 48° F. the syrup showed a specific gravity of 1.32, 35.0 Baumé, 64.0 Brix and a viscosity of 425 centipoises.

In the above examples, a small amount of stabilizer is used to thicken the syrup and aid in maintaining the cocoa in suspension. The following example illustrates a syrup without a stabilizer.

EXAMPLE 4

A chocolate syrup was made containing the following ingredients in the following proportions per gallon of syrup:

| | Ozs. |
|---|---|
| Liquid invert syrup (41°Bé.) | 90 |
| Water | 34 |
| Cocoa (14 to 16% fat) | 11 |
| Milk powder | 2 |
| Salt | .031 |
| Disodium phosphate | .031 |
| Vanillin | .031 |

Since this syrup was made without a stabilizer it should be shaken in the containers before use to overcome any tendency toward the settling of the cocoa. This syrup was used with nitrous oxide as the pressurizing gas at 100 pounds pressure to give a self-agitating discharge jet.

*Flavored syrup packages*

The flavored syrups which are used in making the new pressurized packages include a wide variety of fruit flavored and other flavored syrups, of flavors such as those commonly dispensed at soda fountains. Ordinarily about 1 ounce of soda fountain syrup is required per glass of flavored drink. We have found it advantageous to utilize a much more concentrated fruit flavored syrup such that only about ½ ounce is required to make a flavored drink. And we have found that this small amount of syrup can advantageously be dispensed from a pressurized container or package, where the syrup is of proper viscosity, and is discharged as a small high velocity self-agitating jet into the liquid which it is to flavor.

Much the same advantages described in connection with chocolate syrup packages are obtained with the fruit flavored syrup packages.

In making fruit flavored syrups, and other flavored syrups, such as coffee syrup, etc. of a concentration such that only about one-half as much is required as of ordinary soda fountain syrups, the amount of sugar and flavor are increased but it is not necessary to double the amount of sugar and flavor to obtain a satisfactory drink with one-half the amount of syrup. The dispensing of the flavored syrups, particularly where a dissolved gas is used as the pressurizing gas, such a nitrous oxide or carbon dioxide, or both, results in an improved flavor or taste.

It is important to regulate the viscosity of the flavored syrup and in general the viscosity should be between about 225 centipoises and 750 centipoises.

The size of the discharge openings of the valve used with such syrups is similar to that described in connection with chocolate syrup. Thus, the bore of the discharge orifice is advantageously within the range of about 0.05 to 0.09 inch in diameter, and more advantageously about 0.07 to 0.08 inch in diameter.

The improved flavored syrup packages will be further illustrated by the following examples illustrating the use of various fruit flavored syrups and coffee syrup.

In the following examples the coloring mixtures are standard syrup colors prepared by dissolving two ounces of color in 128 ounces (1 gallon) of water. The sugar color is a caramel color.

EXAMPLE 5

A strawberry flavored syrup was made which contained the following ingredients in the following proportions for each 100 gallons of finished syrup. The strawberry flavor used was an aqueous alcoholic extract of about 30 pounds or more of strawberries in one gallon of extract.

19 gallons water
79 gallons sugar syrup (41° Bé.)
8 lbs. citric acid
½ oz. red color
1¼ ozs. light red color
4 fluid ozs. sugar color
2 gallons, 16 fluid ozs. pure fruit strawberry flavor
100 fluid ozs. sodium benzoate solution (20 ozs. to the gallon of water)

This syrup showed a viscosity of 353 centipoises, a specific gravity of 1.343, a Baumé of 37.0 and 70.5 Brix. This syrup was found to work satisfactorily where the discharge opening in the valve was in the range of 0.07 to 0.085 inch, using both dissolved gas as the propellent (nitrous oxide or carbon dioxide, or a mixture), as well as nitrogen gas, with thorough agitation of the container before the syrup was dispensed therefrom.

EXAMPLE 6

A pure fruit cherry syrup was made containing the following ingredients in the following proportions for each 100 gallons of finished syrup. The cherry flavor used was an aqueous alcoholic extract of about 24 to 40 pounds of cherries per gallon of extract. A small amount of pit oil was added.

18 gallons of water
78 gallons of sugar syrup (41° Bé.)
8 lbs. of citric acid
1¼ ozs. red color
½ oz. deep red color
32 fluid ozs. sugar color
4 gallons pure fruit cherry flavor
6 ozs. oil of almond flavor
100 fluid ozs. sodium benzoate solution (20 ozs. to the gallon of water)

This syrup showed a viscosity of 550 centipoises, 1.360 specific gravity, 37.0 Baumé and 71.0 Brix. This syrup was satisfactorily used in the improved container with the soluble pressurized gases and also with nitrogen with effective agitation and with valves having a restricted discharge orifice of 0.07 to 0.085 inch in diameter.

A variation of the above formula was made using 9½ ounces of the above cherry syrup mixed with ½ ounce of water to give a syrup having a viscosity of 225 centipoises, 1.325 specific gravity, 36.0 Baumé and 68.75 Brix. This syrup was satisfactorily dispensed as a self-agitating jet to produce a self-agitated beverage in the manner above described.

EXAMPLE 7

A pure fruit grape syrup was produced containing the following ingredients in the following amounts in 100 gallons of finished syrup. The grape flavor was an aqueous alcoholic extract of over 40 pounds of grapes per gallon of extract.

10 gallons water
15 gallons grape juice concentrate (4 to 1 concentrate)
74 gallons sugar syrup
12 lbs. citric acid
4 lbs. tartaric acid
1 oz. red color
3 ozs. grape color
15 fluid ozs. sugar color
1½ gallons grape flavor
100 fluid ozs. sodium benzoate solution (20 ozs. to the gallon of water)

This syrup showed a viscosity of 650 centipoises, 1.345 specific gravity, 37.0 Baumé and 70.5 Brix. This syrup in the pressurized container gave a satisfactory self-agitating discharge jet and a self-agitated grape beverage.

EXAMPLE 8

A coffee syrup was made containing the following ingredients in the following amounts per 100 gallons of finished syrup:

49 gallons water
540 lbs. white sugar
15 gallons sweetose (corn syrup 43° Bé.)
18 lbs. soluble coffee extract (powder)
10 ozs. salt by weight
100 fluid ozs. sodium benzoate solution (20 ozs. to the gallon of water)

This syrup showed a viscosity of 725 centipoises, 1.350 specific gravity, 36.0 Baumé and 67.0 Brix. When this syrup was dispensed in the pressurized container through a valve having a discharge orifice of 0.07 to 0.085 inch in diameter it gave a satisfactory self-agitated stream and a self-agitated coffee drink.

Other fruit flavored syrups can be produced in a similar way, using other fruit flavors, and similarly used in making self-agitated beverages. Other flavored syrups, such as root beer, ginger ale, etc. can similarly be made and used.

*Fruit juice concentrate packages*

Fruit juice concentrates have commonly been packed in tin cans to be kept frozen until thawed for use, or have required storage in a refrigerator at temperatures under 40° F. and required to be used up within a short period of time.

The present invention provides improved pressurized packages of sterile concentrated fruit juices in pressurized packages or containers with a discharge valve having a small regulated orifice of the kind previously described whereby the concentrate can be discharged from the container as a small, high velocity jet into water to produce the fruit juice beverage.

The present invention enables sterile fruit juice concentrates to be packaged in packages with an extended shelf life, and enables them to be instantly used for producing fruit juices therefrom by self-agitation, without the necessity of stirring the concentrate and the diluting water.

The packaged fruit juice concentrates are sterile concentrates packaged in a sterile pressurized container having a restricted discharge opening through which they are dispensed as a high velocity stream to effect self-agitation with the diluting water. The unused portion of the concentrate can be kept in the sterile container for considerable periods of time.

Fruit juice concentrates differ widely in their properties. It is difficult to determine accurately the viscosity of concentrated fruit juices where these juices are non-Newtonian liquids, that is, where their viscosities depend upon the rate of shear, but by proper regulation of the concentration and gravity and approximate viscosity of the concentrate we have found that they can advantageously be used in the pressurized containers with the restricted discharge orifice and dispensed in small high velocity self-agitating streams of the kind previously described.

The packaging of such fruit juice concentrates in such pressurized containers has the advantage of ease, convenience, cleanliness and economy of dispensing, enables a substantially "instant" drink to be produced, gives sterile packages with an increased shelf life due to the absence of deleterious effects of air in the container, and enables reconstituted fruit juices to be obtained of an accented taste by the use of carbon dioxide or nitrous oxide or mixtures of both as the pressurizing gas.

In the following examples the fruit juice concentrates were made by starting with such concentrates as were available and adjusting the formula to produce a concentrate which could readily be dispersed as a high velocity self-agitating jet through a restricted valve discharge opening having a bore of about 0.07 to 0.085 inch in diameter.

EXAMPLE 9

A Sunkist orange concentrate of 5:1 concentration had a viscosity range of 193 to 275 centipoises, specific gravity of 1.282, Baumé of 30.5 and 58.5 Brix. This concentrate is a non-Newtonian liquid. Packaged in a pressurized container with nitrous oxide, carbon dioxide or nitrogen under 100 pounds pressure and dispensed as above described, gave a satisfactory self-agitating jet of the concentrate when discharged into a glass of water.

Similar concentrates of 4:1 concentration and 3:1 concentration were similarly used. The 4:1 concentrate was 27.0 Baumé, 51.5 Brix, 1.325 specific gravity and 75–85 centipoises, and was a non-Newtonian liquid. The 3:1 concentrate was 21.5 Baumé, less than 50 Brix, 1.192 specific gravity and had a viscosity of 30 centipoises. This concentrate is a Newtonian liquid, and is not dependent upon rate of shear.

EXAMPLE 10

Minute Maid orange juice of 28.0 Baumé, 64 Brix, 1.60 specific gravity and a viscosity range of 6500–24,000 centipoises (a non-Newtonian liquid) was too thick and viscous to be properly dispensed. But by admixing this product with water in proportions of 10 ounces of the product and 1½ ounces of water a concentrate was obtained of 25.0 Baumé, 54 Brix, 1.360 specific gravity and a viscosity range of 2,350–8,000 centipoises which dispensed well from a pressurized container with a discharge opening of the character above referred to and using carbon dioxide, nitrous oxide or nitrogen as the pressurizing gas.

EXAMPLE 11

A grapefruit juice concentrate of 5:1 concentration (Central Florida) of 28.0 Baumé, 53 Brix, 1.250 specific gravity and a viscosity range of 1800–4500 centipoises (a non-Newtonian liquid) was well dispensed from the pressurized container with carbon dioxide, nitrous oxide, or nitrogen.

EXAMPLE 12

A prune juice concentrate of 37.5 Baumé, 70.25 Brix, 1.355 specific gravity and a viscosity range of 9800–12,000 centipoises (a non-Newtonian liquid) was too thick and viscous to be properly dispensed. But by diluting this concentrate in the proportions of 10 ounces of concentrate and 2½ ounces of water a concentrate of 3½:1 was obtained of 25.5 Baumé, 52.75 Brix, 1.265 specific gravity and a viscosity range of 1400–2500, which was satisfactorily dispensed from a pressurized container using the restricted valve discharge and with carbon dioxide, nitrous oxide or nitrogen as the pressurizing gas.

EXAMPLE 13

An apple juice concentrate (5:1 concentration) of 39.0 Baumé, 70 Brix, 1.40 specific gravity and a viscosity range of 1100–2300 centipoises dispensed well from a pressurized container of the kind above-referred to, using carbon dioxide, nitrous oxide or nitrogen as the pressurizing gas.

EXAMPLE 14

Concord Grape Juice (unsweetened) (6:1 concentration) of specific gravity 1.226 and viscosities of 73–200 centipoises were somewhat too limpid for satisfactory dispensing from the pressurized container, but by adding 35 percent of sugar to form a sweetened grape juice of 6:1 concentration the product was satisfactorily dispensed from the pressurized container using the various gases above-referred to. The sweetened grape juice concentrate was 31.0 Baumé, 54 Brix, 1.295 specific gravity, and had a viscosity range of 230–500 centipoises.

EXAMPLE 15

Dole Pineapple Juice (4½:1 concentration) of 33.0 Baumé, 61 Brix, 1.30 specific gravity and a viscosity range of 4350–12,500 centipoises (a non-Newtonian liquid) was satisfactorily dispensed from the pressurized container with the various gases above-referred to and using the restricted discharge valves to obtain a small high velocity self-agitating stream.

For the satisfactory packaging of most concentrated fruit juices they should be sterile and packaged under sterile conditions in a sterile container, or sterilizer after packaging.

One of the advantages observed in connection with the reconstituted fruit juices produced by the self-agitating discharge of the concentrate into the diluting water was a notably better taste in the drinks so obtained. For example, we took the frozen Minute Maid orange juice concentrate wherein the directions on the container specified that this should be used in the proportions of one part concentrate to 3 parts of water and produced a diluted product in this way. We found that when we took the same product and thawed it out and placed it in the pressurized container in the manner above described and dispensed it as a self-agitating stream through the restricted discharge orifice we could produce an equivalent tasting product using 4 parts of water to one part concentrate, instead of 3 parts of water and one part of concentrate. This was determined by a series of taste panels wherein individuals were asked to taste both of these products with the result that they considered them both of about equal taste, but chose the one that had been produced from the pressurized container in preference to the one which was made according to the directions on the can.

In a similar manner other fruit juice concentrates of regulated viscosity and other properties can be packaged in the new pressurized containers with restricted discharge orifices for giving a high velocity self-agitating jet.

Milk concentrate packages

Milk concentrates, including whole milk concentrates, skim milk concentrates, or a combination of either of these concentrates with chocolate, can advantageously be packaged in pressurized containers of the nature previously described and dispensed therefrom to give reconstituted milk or chocolate-milk beverages.

Milk has been concentrated to form milk concentrates which have been packed in glass bottles or tin cans and used in admixture with water to form a reconstituted milk. Even though sterile when packaged the packages may lose their sterility when they are opened and a portion of the milk concentrate discharged therefrom so that once the original container was opened its contents had to be used up within a short period. Evaporated or condensed milk, packed in tin cans, usually has an overcooked taste. Powdered skim milk or powdered whole milks have to be reconstituted and present difficulties in preparing reconstituted milk.

The present invention provides an improved package for milk concentrates in which the concentrate can be stored and preserved with extended shelf life and maintained in the container in a sterile condition even after portions of the milk concentrate have been removed from the container. The packaging of the milk concentrates in pressurized containers, in accordance with the present invention, enables reconstituted milk to be produced therefrom by discharging the concentrate in the form of a small high velocity stream into an appropriate amount of water with self-agitation to give directly a reconstituted milk beverage.

The milk concentrates which are advantageously used are those prepared by concentrating homogenized milk to a concentration of e.g. 3:1 under conditions which avoid giving to the milk concentrate a cooked flavor, and with homogenizing of the milk concentrate before it is placed in the pressurized container. The preparation of such milk concentrates is described by Nielsen in the "American Milk Review" for September 1959, pages 64, 66, 68, 151, entitled "The Technology of Concentrated Milk." The preparation of concentrated milk is described in this article as follows:

"In order to achieve the near-sterility of their concentrated milk, the Wisconsin workers used equipment and techniques that vary somewhat from those of fluid milk plants. In brief the procedure is as follows:

"1. Standardize milk to a fat content of 3.5 percent fat and 12.0 percent total solids.

"2. Preheat in tubular heater to 170° F. and homogenize (single stage) at 2100 p.s.i.

"3. Heat in high-temperature heat exchanger to 270° F. for 3 seconds.

"4. Concentrate in the vacuum pan at 100–110° F. to 36.5 percent total solids.

"5. Standardize with sterile water to 36.1 percent total solids.

"6. Preheat the standardized concentrate to 140–145° F.

"7. Heat the concentrate in the high temperature heat exchanger to 220° F. for 3 seconds.

"8. Cool to 45° F. and package the product in sanitary type cans in an aseptic canning system.

"The features of this process contributing to the sterility and keeping quality of the product are:

"1. Ultra-high temperature treatment of milk and concentrate.

"2. Special engineering for cleaning-in-place and for sanitization of the system with steam.

"3. Aseptic canning of the finished product."

Such milk concentrates are advantageously used in the new pressurized packages, and in the new method of dispensing the concentrated milk, according to the present invention.

In packaging the milk concentrates we have used for example, skim milk concentrate containing 30 percent solids. This skim milk concentrate was pasteurized at 160° F. and was filled hot into the 16-ounce container such as illustrated in the drawings using 12 ounces of the concentrate in the container. The valve was then applied to the container to form a sealed container and this was then charged while hot with nitrogen gas at 130 pounds per square inch. These products were then stored in refrigeration at 40° F. Tests were taken at the time of packaging which revealed a very low bacteria count. Further tests were then made periodically to determine the growth of bacteria. We found that even though bacteria was present at the outset the growth could be retarded when packaged in the manner described so as to obtain a minimum shelf life under refrigeration at 40° F. of from 30 to 45 days.

Where the milk concentrate is not sterile, refrigeration is required to maintain a prolonged shelf life. It is more advantageous to package the milk concentrate with sterilization of the milk concentrate before packaging, and with packaging under sterile conditions, to obtain a package which does not require refrigeration to preserve the milk concentrate during storage and which will give products of an extended shelf life and which can be dispensed as required while maintaining the milk concentrate which remains in the package in a sterile condition. The methods of producing sterilized fluid milk products are described in the "Journal of Dairy Science" for September 1959, pages 1486–1494 by Herried and Tobias, using ultra-high temperature short-time treatment with sterilizing of both the milk and the apparatus. Another system of sterilizing concentrated food products with pre-sterilizing of the cans, filling cans with the sterile product and sealing the cans to preserve sterility is described by Cheal and Havighorst in "Food Engineering" for March 1958, pages 89–91.

For producing the new concentrated milk packages it is important, in producing a sterile product with a long shelf life, to insure that the milk concentrate is sterilized before packaging and packaged under sterile conditions, or subjected to sterilizing treatment after packaging. Concentrated milk packages so prepared maintain the milk concentrate in a sterile condition for relatively long periods of time. And they can readily be used to form the reconstituted milk by discharging the concentrate in the form of a small high velocity jet into water in proper proportions to form directly a self-agitated milk without the need of stirring with a spoon or other mechanical agitation.

With homogenized whole milk concentrates, they are protected from separation of butterfat. And the concentrates are protected from the action of air in the container because the containers are highly charged with an inert gas, even when the containers have been partly emptied.

Milk chocolate concentraes can advantageously be made by admixing chocolate syrup with skim milk concentrates or whole milk concentrates in proper proportions and advantageously with homogenizing of the mixture before it is packaged.

The invention will be further illustrated by the following examples in which the milk concentrates or chocolate milk concentrates were packaged in containers such as previously described.

EXAMPLE 16

A skim milk concentrate of about 3:1 concentration, such as described in the Nielsen article, was obtained from Delwood Dairy. This concentrate had a low viscosity of 12 centipoises, 1.125 specific gravity, 15.0 Baumé and 28.5 Brix. The sterilized concentrate was packaged under sterile conditions. The use of nitrogen gas as the pressurizing gas gave a high velocity jet stream with somewhat less foam than when nitrous oxide or carbon dioxide was used as the pressurizing gas.

When a package containing this milk concentrate was dispensed in the form of a small high velocity jet into a glass of water it produced almost instantly a self-agitated reconstituted milk drink. With a 3:1 concentration of the concentrate approximately three parts of water are required for one part of the concentrate to form the reconstituted milk.

EXAMPLE 17

A chocolate skim milk concentrate was produced by using a 3:1 skim milk concentrate such as described in the preceding example, and mixing it with a Dairy Mix chocolate in the proportions of 15 ounces by weight of the chocolate to each quart of skim milk concentrate and thoroughly mixing. The Dairy Mix chocolate was used in the form of a syrup containing, for each 1000 pounds of the syrup, the following ingredients in the following proportions:

23 gallons water
6 lbs. H. F. Stabilizer powder
16 lbs. sugar
60 gallons 76 Brix invert sugar syrup
50 lbs. Ambrosia cocoa—18 to 20% butterfat
60 lbs. Hillderbrand cocoa—10 to 12% butterfat
0.32 oz. salt
0.27 oz. disodium phosphate
25 lbs. malt diastase
½ lb. vanillin
0.08 ounce ethyl vanillin The resulting mixture had a viscosity of 2200–9500 centipoises and 1.020 specific gravity. It had a Baumé of 25.0–28 and a Brix of 18–20, although the mixture was too heavy to determine the upper limits of both Baumé and gravity accurately.

When this mixture was placed in a pressurized container in the proportions of 10 ounces in a 16-ounce container and the container pressurized at 100 pounds pressure the mixture dispensed well from the container in the form of a small high velocity self-agitating jet forming with water a chocolate milk drink. Nitrous oxide appeared to be a better gas than carbon dioxide or nitrogen with this chocolate milk concentrate.

Such a chocolate milk concentrate may when stored in a refrigerator increase in viscosity to the point where it will not readily dispense, even though it will dispense properly at ordinary temperatures. This objection can be overcome by the use of a chocolate syrup containing less stabilizer.

Homogenized whole milk concentrates, and mixtures of such concentrates with chocolate syrup, can also be produced. When chocolate syrup is used the mixture of milk concentrate and syrup is advantageously homogenized before charging it into the container. For long life the concentrate or the mixture of concentrate and syrup should be effectively sterilized and maintained in sterile condition during packaging, or effectively sterilized after packaging.

The new concentrated milk packages such as above described enable milk concentrates to be kept in a sterile condition for long periods of time. They have the advantage that when only a part of the concentrate is dispensed to form a glass of reconstituted milk, the remainder of the concentrate is maintained in a sterile condition in the container until it also is dispensed. The new packages also have the advantage that they do not require refrigeration during storage, when the contents are packaged in a sterile condition.

The new milk concentrate packages have the further advantage that they can make use of readily available standard containers of the kind which are adapted to withstand pressure by providing these standard containers with a special discharge valve having the restricted discharge orifice which gives a small high velocity self-agitating jet.

In the case of milk concentrates, with their low viscosity, valves with somewhat larger orifices can be used, e.g. up to around 0.11 inch in diameter or somewhat more.

*Coffee extract packages*

Coffee extracts are commonly prepared in powder form and packaged in sealed containers. When the container has once been opened the coffee powder tends to deteriorate through contact with the air. And when the powder is added to water to form a cup of coffee stirring is required.

The present invention provides an improved coffee concentrate package in which a highly concentrated liquid coffee extract is packaged in a sterile condition in a pressurized container of the kind hereinabove described so that it can be dispensed in the form of a small high velocity self-agitating jet into the water to be used to form the coffee drink without the necessity of further stirring or agitation.

Concentrated coffee solutions contain foaming agents which tend to cause foam when shaken. An insoluble gas such as nitrogen is advantageously used in the pressurized container with such coffee concentrates, and the concentrate is not shaken in the container before it is dispensed. This foaming tendency can be reduced or overcome to a greater or lesser extent by adding a foam reducing agent or a small mount of a thickening agent such as 0.1% of carboxymethyl cellulose.

The coffee concentrate should be sterilized before it is charged into the container, and packaged under sterile conditions, or the package should be sterilized afterwards to insure sterility of the final package.

When the concentrate is discharged from the container through a discharge valve with a regulated small orifice, such as previously described, in the form of a small high velocity jet, into water to form a coffee drink its self-agitating action will result in the production of a coffee drink without further stirring or agitation.

The coffee concentrates are advantageously formed of relatively high concentrates such that, for example, only about one-half ounce of the concentrate is needed to form a coffee beverage with 7½ ounces of water, so that about 20 drinks of coffee beverage can be obtained from a 16-ounce package containing 10 ounces of the coffee concentrate.

The invention will be further illustrated by the following example:

EXAMPLE 18

A coffee concentrate of 26 percent solids (Hampton House) was of 1.119 specific gravity, 13.5 Baumé, and 26 Brix. The concentrate was a thin liquid, the viscosity of which could not be readily determined. This concentrate was packaged in a pressurized container of the kind previously described using nitrogen as the pressurizing gas and the concentrate was dispensed without shaking the container in the form of a small high velocity self-agitating jet into water to produce a coffee drink without further stirring or agitation.

The packaging of coffee concentrates in this way protects the coffee concentrate in the package from deterioration by contact with the air.

The sterile coffee concentrate can be maintained in the container in sterile form and without deterioration for long periods of time and even though the container may be partly emptied by the use of the portion of the concentrate therein.

Instead of using the coffee concentrate by itself in the pressurized containers it can advantageously be combined with a sufficient amount of milk concentrate, or whole milk concentrate, or milk concentrate with increased cream content, to give directly a self-agitated coffee beverage containing both coffee and milk, or milk and cream. Sugar as well as milk, or milk and cream, can also be added to the coffee concentrate to form a liquid concentrate which, when dispensed into a cup of hot water, in the manner above described, will give directly a self-agitated cup of coffee without need of further stirring or agitation.

Tea concentrate packages

Tea commonly comes to the consumer in bulk or in individual tea bags and the consumer has to extract the tea in hot or boiling water until a desired color and flavor is obtained. Tea concentrates are also available, usually with added sugar and in some cases with lemon added to the concentrates.

The present invention provides an improved tea concentrate packaged in the pressurized containers and dispensed therefrom in the form of a small high velocity jet to form directly with water a tea drink without further stirring or agitation.

Tea concentrates contain foaming agents which tend to cause foam when shaken. This foaming tendency can be reduced by the addition of defoaming agents, or thickening agents, such as carboxymethyl cellulose.

When tea concentrates are packaged in pressurized containers nitrogen is advantageously used as the pressurizing gas to reduce or minimize the foaming tendency, and the tea concentrate is dispensed without shaking the container.

Tea concentrates are advantageously formed of relatively high concentration such that, for example, only about one-half ounce of the concentrate is needed to form a tea beverage with 7½ ounces of water so that about 20 drinks of tea can be obtained from a 16-ounce package containing 10 ounces of the tea concentrate. Even such small amounts of concentrate can be readily dispensed through a valve with a restricted passage opening of the kind hereinabove described, in a matter of a very few seconds.

The invention will be further illustrated by the following examples:

EXAMPLE 19

A Kohmstam tea concentrate was produced of 1.049 specific gravity, 6 Baumé, and 12 Brix. The liquid was too limpid to have its viscosity readily determined. This tea concentrate was packaged in a pressurized container of the kind above described using nitrogen gas as the pressurizing gas and the concentrate was dispensed without shaking the container and gave a self-agitated tea drink when about half an ounce was added to about 7½ ounces of water. Shaking of the container before dispensing may result in objectionable foaming; and nitrous oxide and carbon dioxide are less desirable because of their tendency to produce foam, particularly where a defoaming agent is not used.

EXAMPLE 20

A similar Kohmstam tea concentrate of 1.051 specific gravity, 6.5 Baumé, 14 Brix, and a viscosity of about 12 centipoises was admixed with a small quantity of about 0.1% of carboxymethyl cellulose. The product was too limpid to obtain accuracy of the determination of its viscosity.

The addition of the carboxymethyl cellulose reduced the foaming tendency of the concentrate. Nitrous oxide and carbon dioxide can be used as the pressurizing gases of this concentrate but nitrogen gas is advantageously used.

Instead of using a tea concentrate by itself in the pressurized containers the concentrate can be combined with lemon concentrate or with concentrated milk or sugar, or both milk and sugar, to form a concentrate which will dispense into a cup of hot water and will give a finished tea beverage.

This application is a continuation-in-part of our prior application Serial No. 813,525 filed May 15, 1959.

We claim:

1. A pressurized package for dispensing beverage concentrates into an aqueous liquid, to produce a self-mixed beverage, which comprises a pressure-tight container containing a beverage concentrate of regulated viscosity and a non-toxic propellant gas and having a regulated small discharge orifice, and means for controlling the discharge of the concentrate through said orifice, the viscosity of the beverage concentrate, the pressure of the propellant gas and the size of the orifice being so correlated that the velocity of the concentrate, when discharged downwardly through the orifice into an aqueous liquid, will be such as to effect thorough agitation of the liquid and thorough distribution of the concentrate in the aqueous liquid, without mechanical agitation, with resultant production of a beverage having the discharged concentrate dispersed throughout the aqueous liquid.

2. A pressurized package as defined in claim 1 in which the propellent gas is soluble in the beverage concentrate and the high-velocity jet is an expanded jet having a lower specific gravity than the aqueous liquid into which it is discharged.

3. A pressurized package as defined in claim 1 in which the small discharge orifice is of the order of about 0.05 to about 0.09 inch in diameter.

4. A pressurized package as defined in claim 1 containing concentrated chocolate syrup of a viscosity within the range of about 150 to about 700 centipoises.

5. A pressurized package as defined in claim 1 containing a concentrated flavored syrup of a viscosity within the range of about 225 centipoises to about 750 centipoises.

6. A pressurized package as defined in claim 1 containing concentrated fruit juice.

7. A pressurized package as defined in claim 1 containing a milk concentrate.

8. A pressurized package as defined in claim 1 containing a milk concentrate admixed with chocolate syrup.

9. A pressurized package as defined in claim 1 containing coffee concentrate.

10. A pressurized package as defined in claim 1 containing tea concentrate.

11. A pressurized package as defined in claim 1 in which the regulated small discharge orifice and the means for controlling the discharge of the concentrate therethrough are in the form of a tilting discharge valve for discharging the beverage concentrate downwardly from the inverted container, said tilting valve having a valve seat within the container and a manually operated tubular discharge member for tilting said valve to open it and through which the beverage concentrate is dispensed when the valve is tilted, and said tubular member having an insert therein with an opening therethrough which constitutes the regulated small discharge orifice.

12. A pressurized package as defined in the preceding claim in which the size of the discharge orifice is about 0.05 to about 0.09 inch in diameter.

13. The method of producing self-mixed beverages without mechanical agitation from beverage concentrates miscible with an aqueous liquid, to form the beverage, which comprises maintaining a beverage concentrate of regulated viscosity under the pressure of a non-toxic propellant gas in a pressurized container having a discharge valve with a small discharge orifice of regulated size, correlating the viscosity of the beverage concentrate, the pressure of the propellant gas in the container and the size of the orifice so that the velocity of the concentrate, when discharged downwardly through the orifice into an aqueous liquid, will be such as to effect thorough agitation of the liquid and thorough distribution of the concentrate in the aqueous liquid, without mechanical agitation, and discharging the beverage concentrate under said gaseous pressure, as a small, high-velocity jet, downwardly through said orifice into an aqueous liquid to produce a beverage having the discharged concentrate dispersed throughout the aqueous liquid.

14. The method according to claim 13 in which the propellent gas is soluble in the beverage concentrate and the high velocity jet is an expanded jet having a lower specific gravity than the aqueous liquid into which it is discharged.

15. The process according to claim 13 in which the beverage concentrate is discharged through a small discharge orifice of the order of magnitude of about 0.05 to about 0.09 inch in diameter.

16. The method according to claim 13 in which a concentrated chocolate syrup with a viscosity within the range of about 150 to about 700 centipoises is discharged through an orifice of the order of magnitude of about 0.06 to about 0.09 inch in diameter.

17. The method according to claim 13 in which a concentrated flavored syrup having a viscosity of about 225 to about 750 centipoises is discharged through an orifice of the order of magnitude of about 0.05 to about 0.09 inch in diameter.

18. The method according to claim 13 in which a fruit juice concentrate is discharged through an orifice having a size of the order of about 0.05 to about 0.10 inch in diameter.

19. The method according to claim 13 in which a milk concentrate is discharged through an orifice of the order of about 0.05 to about 0.10 inch in diameter.

20. The method according to claim 13 in which a milk concentrate with admixed chocolate syrup is discharged through an orifice of the order of about 0.05 to about 0.10 inch in diameter.

21. The method according to claim 13 in which a coffee concentrate is the beverage concentrate.

22. The method according to claim 13 in which a tea concentrate is the beverage concentrate.

References Cited in the file of this patent

UNITED STATES PATENTS

| | | |
|---|---|---|
| 2,294,172 | Getz | Aug. 25, 1942 |
| 2,695,236 | Barton | Nov. 23, 1954 |
| 2,723,200 | Pyenson | Nov. 8, 1955 |
| 2,757,843 | Smith | Aug. 7, 1956 |

OTHER REFERENCES

"Modern Packaging," November 1957, pages 116–118 and 238.

"Food Engineering," March 1958, page 28.

"Food Engineering," May 1958, pages 64 to 67.